United States Patent [19]
Tjon-Joe-Pin et al.

[11] Patent Number: 5,806,597
[45] Date of Patent: Sep. 15, 1998

[54] STABLE BREAKER-CROSSLINKER-POLYMER COMPLEX AND METHOD OF USE IN COMPLETION AND STIMULATION

[75] Inventors: Robert Tjon-Joe-Pin, Houston; Joseph E. Thompson, Sr., Houston; Marshall G. Ault, Spring, all of Tex.

[73] Assignee: BJ Services Company, Houston, Tex.

[21] Appl. No.: 640,462

[22] Filed: May 1, 1996

[51] Int. Cl.⁶ ........................................ E21B 43/26
[52] U.S. Cl. ............................. 166/300; 166/308
[58] Field of Search ................... 166/300, 308, 166/281

[56] References Cited

U.S. PATENT DOCUMENTS

| | | | |
|---|---|---|---|
| 5,010,954 | 4/1991 | Falk | 166/295 |
| 5,201,370 | 4/1993 | Tjon-Joe-Pin | 166/300 |
| 5,224,544 | 7/1993 | Tjon-Joe-Pin et al. | 166/295 |
| 5,247,995 | 9/1993 | Tjon-Joe-Pin et al. | 166/312 |
| 5,404,951 | 4/1995 | Lai et al. | 166/300 X |
| 5,421,412 | 6/1995 | Kelly et al. | 166/300 |
| 5,437,331 | 8/1995 | Gupta et al. | 166/300 |
| 5,447,199 | 9/1995 | Dawson et al. | 166/300 |
| 5,562,160 | 10/1996 | Brannon et al. | 166/300 X |

FOREIGN PATENT DOCUMENTS

| | | | |
|---|---|---|---|
| PCT/US91/03756 | 12/1991 | WIPO | C12N 9/00 |

OTHER PUBLICATIONS

Brannon, H.D., and R.M. Tjon–Joe–Pin, "Biotechnological Breakthrough Improves Performance of Moderate to High–Temperature Fracturing Applications," *Society of Petroleum Engineers,* SPE 28513 (1994) pp. 515–530.

Dixon, Malcolm, Edwin C. Webb, et al. Enzymes, *Academic Press* (New York–San Francisco 1979, 3d ed.) p. 162.

*Primary Examiner*—William P. Neuder
*Attorney, Agent, or Firm*—Arnold, White & Durkee

[57] ABSTRACT

A preferred novel breaker-crosslinker-polymer complex and a method for using the complex in a fracturing fluid to fracture a subterranean formation that surrounds a well bore by pumping the fluid to a desired location within the well bore under sufficient pressure to fracture the surrounding subterranean formation. The complex may be maintained in a substantially non-reactive state by maintaining specific conditions of pH and temperature, until a time at which the fluid is in place in the well bore and the desired fracture is completed. Once the fracture is completed, the specific conditions at which the complex is inactive are no longer maintained. When the conditions change sufficiently, the complex becomes active and the breaker begins to catalyze polymer degradation causing the fracturing fluid to become sufficiently fluid to be pumped from the subterranean formation to the well surface.

9 Claims, No Drawings

STABLE BREAKER-CROSSLINKER-POLYMER COMPLEX AND METHOD OF USE IN COMPLETION AND STIMULATION

BACKGROUND OF THE INVENTION

Oil well stimulation typically involves injecting a fracturing fluid into the well bore at extremely high pressure to create fractures in the rock formation surrounding the bore. The fractures radiate outwardly from the well bore, typically from about 100 to 1000 meters, and extend the surface area from which oil or gas drains into the well. The fracturing fluid typically carries a propping agent, or "proppant," such as sand, so that the fractures are propped open when the pressure on the fracturing fluid is released, and the fracture closes around the propping agent.

Fracturing fluid typically contains a water soluble polymer, such as guar gum or a derivative thereof, that provides appropriate flow characteristics to the fluid and suspends the proppant particle. When pressure on the fracturing fluid is released and the fracture closes around the propping agent, water is forced out and the water-soluble polymer forms a filter cake. This filter cake can prevent oil or gas flow if it is not removed.

Breakers are added to the fracturing fluid to enable removal of the filter cake. Breakers catalyze the breakdown of the polymer in the compacted cake to simple sugars, making the polymer fluid so that it can be pumped out of the well. Currently, breakers are either enzymatic breakers or oxidative breakers.

Oxidative breakers have been widely applied in fracturing applications. Oxidizers react non-specifically with any oxidizable material including hydrocarbons, tubular goods, formation components, and other organic additives. Oxidizers release free radicals that react upon susceptible oxidizable bonds or sites. Free radicals are charged ions with unpaired electrons and are very reactive due to their natural tendency to form electron-pair bonds. Free radicals can be generated from either thermal or catalytic activation of stable oxidative species. The major problem with using oxidative breakers to remove a proppant cake is that reactions involving free radicals are usually very rapid so the proppant cake may become fluid before the pumping treatment is completed.

Encapsulated oxidative breakers were introduced to provide a delayed release of the persulfate breaker payload until after the pumping treatment is complete. However, there are several problems related to using encapsulated breakers in hydraulic fracturing treatments. First, premature release of the oxidative payload sometimes occurs due to product manufacturing imperfections or coating damage resulting from abrasion experienced in pumping the particles through surface equipment, tubulars, and perforations. Second, homogeneous distribution of encapsulated breaker is more difficult within the propped fracture. Since the persulfate is confined to individual encapsulated particles, encapsulated breakers must be added throughout the pumping process to achieve adequate distribution.

Enzymes are a second type of breaker that exhibits a unique ability to act as a biocatalyst to accelerate chemical reactions. The catalytic activity does not change the enzyme structure during reaction initiation and thus, the enzyme may initiate another reaction, and so on. A polymer-specific enzyme is an enzyme that will align and react with only that particular polymer.

The problem with enzymatic breakers is that they begin catalyzing polymer degradation immediately upon addition. Encapsulating enzymes helps alleviate this problem, but causes the same type of problems described above with encapsulated oxidants. A method is needed to prevent or reduce immediate degradation of enzyme additives, while allowing the enzymes to be evenly dispersed throughout the polymer and to retain their activity.

SUMMARY OF THE INVENTION

According to one aspect of the invention, a gellable fracturing fluid composed of a breaker-crosslinker-polymer complex is provided. The complex comprises a matrix of compounds, substantially all of which include a breaker component, a crosslinker component and a polymer component. The complex may be maintained in a substantially non-reactive state by maintaining specific conditions of pH and temperature. A preferred breaker includes an enzyme more particularly a high-temperature-high-pH-guar-specific enzyme or a high-temperature-high-pH-cellulose specific enzyme. The preferred crosslinker components include any of the conventionally used crosslinking agents that are known to those skilled in the art. For instance, in recent years, gellation of the hydratable polymer has been achieved by crosslinking these polymers with metal ions including aluminum, antimony, zirconium and titanium containing compounds including the so-called organometallics. Transition metals such as zirconium and titanium crosslinkers are preferred. Borate ion donating materials are also preferred as crosslinkers, for example, the alkali metal and the alkaline earth metal borates and boric acid. Crosslinkers that contain boron ion donating materials may be called borate systems. Crosslinkers that contain zirconium may be called zirconate systems. A preferred polymer component includes guar or guar derivatives in particular carboxymethyl-hydroxypropyl guar and cellulose or cellulose derivatives. The polymer must be compatible with the enzyme and the crosslinker. The conditions at which a preferred complex may be maintained in a substantially non-reactive state are about pH 9.3 to 11.0 and temperature of about 70° F. to 300° F.

According to another aspect of the invention, a method for using the breaker-crosslinker-polymer complex in gellable fracturing fluid are provided. A preferred method for using the fracturing fluid includes pumping the fluid comprising the complex in a substantially non-reactive state to a desired location within the well bore under sufficient pressure to fracture the surrounding subterranean formation. The complex is then maintained in the substantially non-reactive state by maintaining specific conditions of pH and temperature until a time at which the fluid is in place in the well bore and the desired fracture treatment or operation is completed. Once the fracture is completed, the specific conditions at which the complex is inactive are no longer required. Such conditions that may change, for example, are pH and temperature. When the conditions change sufficiently, the complex becomes active and the breaker begins to catalyze polymer degradation causing the fluid to become less viscous, allowing the "broken" fluid to be produced from the subterranean formation to the well surface. A "broken" fluid is considered as a fluid having a viscosity of less than 10 cps at $511^{S-1}$.

The benefits of using the complex and the method of this invention are that more even distribution of the breaker is achieved, initial or front-end viscosity at temperature of the fracturing fluid is substantially increased, and the filter cake is more efficiently removed. The benefits of this invention may be achieved when the breaker is added to a crosslinker and polymer combination or when the breaker is first combined with the crosslinker and then added to the polymer.

DETAILED DESCRIPTION OF THE PREFERRED EMBODIMENTS

In practicing a preferred method of the invention, an aqueous fracturing fluid is first prepared by blending a hydratable polymer into an aqueous fluid. The aqueous fluid could be, for example, water, brine, aqueous based foams or water-alcohol mixtures. Any suitable mixing apparatus may be used for this procedure. In the case of batch mixing, the hydratable polymer and the aqueous fluid are blended for a period of time sufficient to form a hydrated solution. The hydratable polymers useful in the present invention may be any of the hydratable polysaccharides and are familiar to those in the well service industry. These polysaccharides are capable of gelling in the presence of a crosslinking agent to form a gelled based fluid. Specific examples are guar gum, guar gum derivatives, cellulose and cellulose derivatives. The preferred gelling agents are guar gum, hydroxy propyl guar and carboxymethyl-hydroxypropyl guar (CMHPG), carboxymethyl guar (CMG), or carboxymethylhydroxyethyl cellulose (CMHEC).

The hydratable polymer may be added to the aqueous fluid in concentrations ranging from about 0.06% to 1.8% by weight of the aqueous fluid. The most preferred range for the present invention is about 0.3% to about 0.96% by weight.

In addition to the hydratable polymer, the fracturing fluids of the invention include a crosslinking agent. The preferred crosslinkers include any of the conventionally used crosslinking agents that are known to those skilled in the art. For instance, in recent years, gellation of the hydratable polymer has been achieved by crosslinking these polymers with metal ions including aluminum, antimony, zirconium and titanium containing compounds including the so-called organometallics. Transition metals such as zirconium and titanium crosslinkers are preferred. Borate ion donating materials are also preferred as crosslinkers, for example, the alkali metal and the alkaline earth metal borates and boric acid. See, for instance, U.S. Pat. No. 4,514,309 and U.S. Pat. No. 5,201,370. Zirconium and boron crosslinking agents (zirconate or borate crosslinkers) are the most preferred of this invention.

A preferred zirconate crosslinking additive is preferably present in the range from about 0.5% to in excess of 2.0% by weight of the polymer. Preferably, the concentration of crosslinking agent is in the range from about 0.7% to about 1.5% by weight of the polymer.

A preferred borate crosslinking additive is preferably present in the range from about 0.5% to in excess of 2.0% by weight of the polymer. Preferably, the concentration of crosslinking agent is in the range from about 0.7% to about 1.5% by weight of the polymer.

Propping agents are typically added to the base fluid prior to the addition of the crosslinking agent. Propping agents include, for instance, quartz sand grains, glass and resin coated ceramic beads, walnut shell fragments, aluminum pellets, nylon pellets, and the like. The propping agents are normally used in concentrations between about 1 to 18 pounds per gallon of fracturing fluid composition, but higher or lower concentrations can be used as required. The base fluid can also contain other conventional additives common to the well service industry such as surfactants.

Unlike the breaker system of the prior art, a new highly stable breaker-crosslinker-polymer complex has been developed that reduces premature fluid degradation while allowing the breaker to be evenly dispersed throughout the polymer. Such a stable breaker-crosslinker-polymer complex may be prepared by determining specific conditions of pH and temperature at which a specific breaker-crosslinker-polymer forms a stable complex with a matrix of compounds, each compound including a compatible breaker, polymer, and crosslinker. Then, fracturing fluid is maintained at those conditions until the fluid is in place in the subterranean formation. Next, the conditions are allowed to vary such that the complex becomes active and the reaction, in which the polymer is broken down to lower molecular weight fragments, is catalyzed by the breaker. Once the polymer is broken down to lower molecular weight fragments, a fluid consistency develops that allows the polymer to be easily removed from the well.

Incredible unexpected rheological properties have been attributed to the use of this breaker-crosslinker-polymer complex. Upon formation of the complex, up to about 50% increase in initial viscosity has been demonstrated when compared to the initial viscosity of fracturing fluids without the complex to which breaker has been added. Tables 2 and 3 demonstrate the high initial viscosity of this invention. This high initial viscosity is believed to be due to a matrix of high molecular weight compounds contained in the complex. It is believed that each of the compounds in the matrix is made up of enzyme, crosslinker and polymer held together in equilibrium as long as specific conditions are maintained.

Preferred breaker components of this invention are polymer specific enzymes. A particularly advantageous feature of polymer-specific-enzyme breakers with respect to fracturing applications, is that upon introduction to the aqueous polymer solution, the enzyme will attach to a strand of polymer. The enzyme will then "piggy-back" (bind or stay attached) on that polymer strand until such time as conditions are appropriate for the reaction to occur that completely degrades the polymer. The enzyme will migrate to wherever the polymer travels; i.e., within the primary fracture, into natural fractures, or into high permeability matrices. Thus, the enzyme degradant will be distributed and concentrated homogeneously with the polymer throughout the fracture.

Preferred embodiments of the breaker-crosslinker-polymer complex have been demonstrated at a temperature range of about 70° F. to about 275° F. and at a pH of about 9.3 to about 10.5. In this environment, preferred breaker-crosslinker-polymer complexes remain in equilibrium with very little or no dissociation and the breaker does not substantially degrade the polymer.

As can be seen in Tables 2 and 3, incredible initial viscosity has been demonstrated with the breaker complex comprising a high-temperature-high-pH-guar-specific enzyme, a diesel slurried CMHPG and a zirconate or guar and a borate crosslinker, respectively. Instead of the usual reduction in viscosity of up to 20% on addition of the breaker, fracturing fluids including the breaker system of this embodiment have exhibited substantially increased viscosity upon addition of the breaker as may be seen by the immediate increase in viscosity demonstrated in Tables 1 and 2. This incredible initial viscosity has been demonstrated whether the enzyme was added to the crosslinker and substrate or the enzyme and crosslinker were added to the substrate.

The underlying basis of this invention may be better explained by considering conventional enzyme pathways which may be described by the following reaction:

$$E+S \rightleftharpoons [ES] \rightleftharpoons E+P \qquad (1)$$

in which E is an enzyme, S is a substrate, [ES] is an intermediate enzyme-substrate complex and P is the product of the substrate degradation catalyzed by the enzyme. The reaction rate of the intermediate enzyme-substrate complex is pH dependent and may be slowed or even virtually halted by controlling the pH and temperature of the enzyme substrate complex.

Further explanation may be found in the following equations and explanation from Malcom Dixon and Edwin C. Webb. Enzymes, Academic Press, p. 162 (New York 1979). For an explanation of the abbreviations, see Table 1.

TABLE 1

SYMBOLS & ABBREVIATIONS

| SYMBOL or ABBREVIATION | DEFINITION |
|---|---|
| S | Substrate |
| ES | Enzyme-Substrate Complex |
| E | Enzyme |
| P | Product |
| $E^n$ | Enzyme with n negative charge |
| $E^nS$ | Enzyme (with n negative charge) - Substrate Complex |
| $E^nS'$ | Enzyme (with n negative charge) - Substrate (Intermediate) Complex prior to breakdown into Product (P) |
| $E^{n+1}$ | Enzyme with n + 1 negative charge |
| $E^{n+1}S$ | Enzyme with n + 1 negative charge - Substrate Complex |
| $E^{n+1}S'$ | Enzyme with n + 1 negative charge - Substrate (Intermediate) Complex prior to breakdown into Product (P) |
| $k_{+1}, k_{+2}, k_{+3}$ | Velocity constants of successive forward steps in an enzyme reaction |
| K | Overall equilibrium constant between $E^nS$ and $E^nS'$ |
| K' | Overall equilibrium constant between $E^{n+1}S$ and $E^{n+1}S'$ |
| $K^s_s$ | Apparent dissociation constant of $E^nS$ Complex |
| $K^s_{s'}$ | Apparent dissociation constant of $E^{n+1}S$ Complex |
| $K_e, K_{es}, K_{es'}$ | Ionization constants of $E^{n\cdot}$, $E^nS$, $E^nS'$ respectively |

Some researchers term such an enzyme-substrate complex that has been virtually halted, a non-productive complex. If a substrate forms a non-productive complex with an enzyme, the pH dependence of V and $K_m$ may give an apparent pK value which diverges from the real value in the productive complex if the ratio of correct to abortive binding changes with the pH. For the scheme:

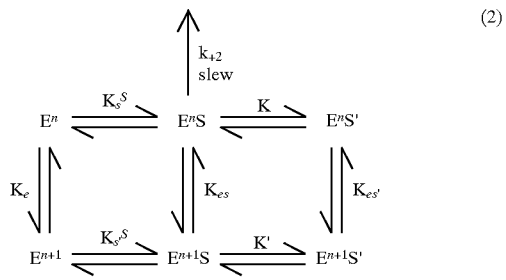

(2)

in which the breakdown of the E"S complex is so slow that the remainder of the system remains in equilibrium, the rate equation becomes $$v = \frac{k + 2^e}{1 + \dfrac{H}{K_{es}} + K\left(1 + \dfrac{H}{K_{es}'}\right)} \Bigg/ \left[1 + \dfrac{\dfrac{K_s S}{S}\left(1 + \dfrac{H}{K_e}\right)}{1 + \dfrac{H}{K_{es}} + K'\left(1 + \dfrac{H}{K_{es}'}\right)}\right]$$ (3)

and thus the observed pK value obtained from plots of $pK_m$ or log V against pH will differ from the true value by the expression $$pK_{observed} = pK - \log \frac{1+K}{1+K'}$$ (4)

As explained in Enzymes at p. 162, other instances of non-productive binding have been discussed. A breaker-crosslinker-polymer complex, however, has not heretofore been described as a component of fracturing fluids.

The following examples will illustrate the invention, but should not be construed to limit the scope thereof unless otherwise expressly noted.

Example 1

A solution containing 2% (w/w) potassium chloride and 10 milliliters of diesel slurried CMHPG polymer (equivalent to 40 pounds per 1000 gallons) was hydrated in one liter of tap water for about 30 minutes. The solution was divided into 250 ml. aliquots. An aliquot was mixed at 1500 rpm to get a vortex. A solution containing 0.3125 ml. of 45% potassium carbonate solution and 0.3125 ml. of zirconate crosslinker was mixed until gelling was completed. Forty-six grams of sample solution was transferred to a FANN model 50C with an R1-B5 rotor cup configuration of rheological measurement at 250° F. No enzyme breaker was added to the system of this example. The results in Table 2, example 1, illustrate the effect of the crosslinker on the polymer at these specific conditions.

Example 2

A solution containing 2% (w/w) potassium chloride and 10 milliliters of diesel slurried CMHPG polymer (equivalent to 40 pounds per 1000 gallons) was hydrated in on liter of tap water for about 30 minutes. The solution was divided into 250 ml. aliquots. An aliquot was mixed at 1500 rpm to get a vortex. A solution containing 0.3125 ml. of 45% potassium carbonate solution, 0.25 ml. of high-temperature-high-pH-guar-specific enzyme with about 30,400 international enzyme units per gram, and 0.3125 ml. of zirconate crosslinker was mixed until gelling was completed. Forty-six grams of sample solution was transferred to a FANN model 50C with an R-1-B5 rotor cup configuration for rheological measurement at 250° F. The results in Table 2, example 2, illustrate the effect of holding this particular fracturing fluid at a pH of about 9.3 and a temperature of 250° F. on the viscosity of the fracture fluid.

Example 3

A solution containing 2% (w/w) potassium chloride and 10 milliliters of diesel slurried CMHPG polymer (equivalent to 40 pounds per 1000 gallons) was hydrated in one liter of tap water for about 30 minutes. The solution was divided into 250 ml. aliquots. An aliquot was mixed at 1500 rpm to get a vortex. A solution containing 0.3125 ml. of 45% potassium carbonate solution, 1.00 ml. of high-temperature-high-pH-guar-specific enzyme was mixed with about 30,400 international enzyme units per gram, and 0.3125 ml. of zirconate crosslinker were mixed until gelling was completed. Forty-six grams of sample solution was transferred to a FANN model 50C with an R1-B5 rotor cup configuration for rheological measurement at 250° F. The results in Table 2, example 3, illustrate the effect of holding this particular fracturing fluid at a pH of about 9.3 and a temperature of 250° F. on the viscosity of the fracture fluid.

Example 4

A solution containing 2% (w/w) potassium chloride and 10 milliliters of diesel slurried CMHPG polymer (equivalent to 40 pounds per 1000 gallons) was hydrated in one liter of tap water for about 30 minutes. The solution was divided into 250 ml. aliquots. An aliquot was mixed at 1500 rpm to get a vortex. A solution containing 0.3125 ml. of 45% potassium carbonate solution and 0.3425 ml. of a composite mixture of a zirconate crosslinker and high-temperature-high-pH-guar specific enzyme with about 30,400 international enzyme units per gam and 0.3125 ml. zirconate crosslinker was mixed until gelling was completed. Forty-six grams of sample solution was transferred to a FANN model 50C with an R1-B5 rotor cup configuration for rheological measurement at 250° F. The results in Table 2, example 5, illustrate the effect of holding this particular fracturing fluid at a pH of about 9.3 and a temperature of 250° F. on the viscosity of the fracturing fluid. These results demonstrate that the beneficial effects of increased viscosity of this fracturing fluid was not affected by adding the crosslinker and the enzyme in combination.

TABLE 2

| | VISCOSITY AT 40 sec$^{-1}$ | | | |
|---|---|---|---|---|
| TIME AT TEMP., HOURS | EXAMPLE 1 (cps) | EXAMPLE 2 (cps) | EXAMPLE 3 (cps) | EXAMPLE 4 (cps) |
| 0 | 691 | 1048 | 726 | 1141 |
| 1 | 591 | 983 | 860 | 962 |
| 2 | 633 | 649 | 696 | 577 |
| 3 | 448 | 401 | 503 | 376 |
| 4 | 622 | 217 | 338 | 259 |
| 5 | 514 | 122 | 185 | 201 |
| 6 | 401 | 83 | 111 | 154 |
| 7 | 267 | 60 | 80 | 133 |
| 8 | 182 | 43 | 60 | 112 |
| 9 | 115 | 39 | 39 | 98 |
| 10 | 94 | 34 | 37 | 89 |
| 12 | 42 | 13 | 28 | 74 |
| 14 | 24 | 2 | 12 | 16 |

Example 5

A solution containing 2% (w/w) potassium chloride and 10 milliliters of diesel slurried guar polymer (equivalent to 40 pounds per 1000 gallons) was hydrated in one liter of tap water about 30 minutes. The solution was divided into 250 ml. aliquots. An aliquot was mixed at 1500 rpm to get a vortex. A solution containing 2.50 ml. of 45% potassium carbonate solution and 1.50 ml. of borate crosslinker were added and the solution mixed until gelling was completed. Forty-two grams of sample solution was a FANN model 50C with an R1-B1 rotor cup configuration for rheological measurement 250° F. The results in Table 3, example 5, illustrate the effect of the crosslinker on the polymer at these specific conditions.

Example 6

A solution containing 2% (w/w) potassium chloride and 10 milliliters of diesel slurried guar polymer (equivalent to 40 pounds per 1000 gallons) was hydrated in one liter of tap water for about 30 minutes. The solution was divided into 250 ml. aliquots. An aliquot was mixed at 1500 rpm to get a vortex. A solution containing 250 ml. of 45% potassium carbonate solution, 1.50 ml. of borate crosslinker, 0.25 ml. of high-temperature-high pH-guar-specific enzyme with about 30,400 international enzyme units per gram was mixed until gelling was completed. Forty-two grams of sample solution was transferred to a FANN model 50C with an R1-B1 rotor cup configuration for rheological measurement at 250° F. The results in Table 3, example 6, illustrate the effect of holding this particular fracturing fluid at a pH of about 10.3 and a temperature of 250° F. on the viscosity of the fracturing fluid.

Example 7

A solution containing 2% (w/w) potassium chloride and 10 milliliters of diesel slurried guar polymer (equivalent to 40 pounds per 1000 gallons) was hydrated in one liter of tap water for about 30 minutes. The solution was divided into 250 ml. aliquots. An aliquot was mixed at 1500 rpm to get a vortex. A solution containing 2.50 ml. of 45% potassium carbonate solution, 1.50 ml. of borate crosslinker and 1.0 ml. of high-temperature-high-pH-guar-specific enzyme with about 30,400 international enzyme units per gram was mixed until gelling was completed. Forty-two grams of sample solution was transferred to a FANN model 50C with an R1-B1 rotor cup configuration for rheological measurement at 250° F. The results in Table 3, example 7, illustrate the effect of holding this particular fracturing fluid at a pH of about 10.3 and a temperature of 250° F. on the viscosity of the fracturing fluid.

TABLE 3

| TIME AT TEMP., | VISCOSITY AT 40 SEC$^{-1}$ | | |
|---|---|---|---|
| HOURS | EXAMPLE 5 | EXAMPLE 6 | EXAMPLE 7 |
| 0 | 1021 | 907 | 922 |
| 1 | 716 | 976 | 881 |
| 2 | 462 | 877 | 655 |
| 3 | 342 | 734 | 512 |
| 4 | 246 | 608 | 425 |
| 5 | 185 | 484 | 312 |

The preceding description of specific embodiments for the present invention is not intended to be a complete list of every embodiment of the invention. Persons who are skilled in this field will recognize that modifications can be made to the specific embodiments described herein that would be within the scope of the invention.

What is claimed is:

1. A method of fracturing a subterranean formation that surrounds a well bore comprising the steps of:
   forming a gellable fracturing fluid comprising the steps of:
   selecting a compatible polymer, crosslinker and breaker; and
   combining the breaker with the crosslinker to form a breaker-crosslinker combination;
   forming a substantially non-reactive breaker-crosslinker-polymer complex by combining the breaker-crosslinker combination with the polymer; and maintaining conditions sufficient to promote formation and maintenance of a stable breaker-crosslinker-polymer complex, said breaker-crosslinker-polymer complex further comprising a matrix of compounds, said compounds each comprising a breaker component, a crosslinker component and a polymer component;

pumping the fracturing fluid to a desired location within the well bore under sufficient pressure to fracture the surrounding subterranean formations;

ceasing to maintain the breaker-crosslinker-polymer complex at conditions sufficient to maintain said substantially non-reactive complex, allowing polymer breakdown to be catalyzed by said breaker, whereby the polymer becomes sufficiently fluid to be pumped from the subterranean formation to the well surface.

2. A method according to claim 1, comprising forming the substantially non-active breaker-crosslinker-polymer complex substantially simultaneously with pumping the fracturing fluid into the well.

3. A method according to claim 1, wherein the breaker comprises an enzyme.

4. A method according to claim 3, wherein the crosslinker is selected from the group consisting of zirconium and a source of borate ions; the enzyme comprises a cellulose specific enzyme; and the polymer comprises a cellulose or a cellulose derivative.

5. A method according to claim 3, wherein the crosslinker comprises a borate system;

the enzyme comprises a guar specific enzyme; and the polymer comprises a guar or a guar derivative.

6. A method according to claim 3, wherein the crosslinker comprises a transition metal.

7. A method according to claim 1, wherein the breaker comprises a cellulose-specific enzyme; the polymer comprises a cellulose or a cellulose derivative; and the specific condition selected to promote internal breaker-stabilizer-complex formation comprises a pH of about 9.3 to about 10.5 and a temperature of about 70° F. to about 300° F.

8. A method according to claim 1, wherein:

the breaker comprises a high-temperature-high-pH-guar-specific enzyme; the polymer comprises a guar or a guar derivative; the crosslinker comprises a transition metal; and the specific condition selected to promote internal breaker-stabilizer-complex formation comprises a pH of about 9.3 to about 10.5 and a temperature of about 70° F. to about 300° F.

9. A method according to claim 1, wherein the polymer comprises a cellulose or a cellulose derivative and the breaker comprises a high-temperature-high-pH cellulose-specific enzyme; and the crosslinker comprises a transition metal.

\* \* \* \* \*

UNITED STATES PATENT AND TRADEMARK OFFICE
CERTIFICATE OF CORRECTION

PATENT NO.    :   5,806,597

DATED         :   September 15, 1998

INVENTOR(S)   :   Robert Tjon-Joe-Pin, Joseph E. Thompson, Sr. and Marshall G. Ault It is certified that error appears in the above-identified patent and that said Letters Patent is hereby corrected as shown below:

Column 4, line 65, in the formula, delete "E+S ∴ [ES] ∴ E+P" and insert thereof --E+S→[ES] →E+P--.

Column 5, line 55, in the formula, delete "slew" and insert thereof --sl●w--.

Column 7, line 59, after "was" insert thereof --transferred to--.

Signed and Sealed this

Twelfth Day of January, 1999

*Attest:*

*Attesting Officer*            *Acting Commissioner of Patents and Trademarks*